(12) United States Patent
Levy et al.

(10) Patent No.: US 11,074,084 B2
(45) Date of Patent: *Jul. 27, 2021

(54) TECHNOLOGIES FOR OPTIMIZING RESUME TIME FOR MEDIA AGNOSTIC USB

(71) Applicant: Intel Corporation, Santa Clara, CA (US)

(72) Inventors: Elad Levy, Rishon le Zion (IL); Rafal Wielicki, Gdansk (PL); Michael Glik, Kfar Saba (IL); Tal Davidson, Petach Tikva (IL); Miron Maevsky, Tel Aviv (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/599,194

(22) Filed: Oct. 11, 2019

(65) Prior Publication Data

US 2020/0150978 A1 May 14, 2020

Related U.S. Application Data

(63) Continuation of application No. 15/637,748, filed on Jun. 29, 2017, now Pat. No. 10,445,108.

(51) Int. Cl.
*G06F 9/4401* (2018.01)
*G06F 13/38* (2006.01)
(Continued)

(52) U.S. Cl.
CPC .......... *G06F 9/4418* (2013.01); *G06F 13/382* (2013.01); *G06F 13/4068* (2013.01); *G06F 13/4282* (2013.01)

(58) Field of Classification Search
CPC ......... G06F 21/31; G06F 3/1236; H04L 67/14
(Continued)

(56) References Cited

U.S. PATENT DOCUMENTS 7,072,989 B1 7/2006 Kolokowsky et al.
7,191,247 B1 3/2007 Philyaw
(Continued)

OTHER PUBLICATIONS

Media Agnostic USB Specification version 1.0a, dated Jul. 29, 2015, 176 pages.*
(Continued)

*Primary Examiner* — Faisal M Zaman
(74) *Attorney, Agent, or Firm* — Hanley, Flight & Zimmerman, LLC

(57) ABSTRACT

A method for operating a media agnostic universal serial bus (MAUSB) device includes a compute device having a link connection manager, a USB manager, and a state manager. The compute device establishes a link with a MAUSB device and a session with the MAUSB device. Subsequently to receipt of a sleep command for the compute device, the compute device transitions to a sleep state and terminates the link with the MAUSB device while keeping intact the session with the MAUSB device. The compute device transitions back to an active state in response to receipt of a wake command for the compute device. The compute device sends a wake request to the MAUSB device. If the MAUSB device responds to the wake request with an acceptance, then the compute device reestablishes the previous session with the MAUSB device. If instead an error is received, the compute device terminates the session.

38 Claims, 7 Drawing Sheets

(51) Int. Cl.
*G06F 13/40* (2006.01)
*G06F 13/42* (2006.01)

(58) Field of Classification Search
USPC ............ 711/164; 709/224, 227, 228; 710/52
See application file for complete search history.

(56) References Cited

U.S. PATENT DOCUMENTS

| | | | |
|---|---|---|---|
| 8,649,768 | B1 | 2/2014 | Gaddam et al. |
| 9,537,927 | B2* | 1/2017 | Matsuda ................. H04L 67/02 |
| 10,445,108 | B2* | 10/2019 | Levy ..................... G06F 13/382 |
| 2002/0068618 | A1 | 6/2002 | Shoobridge |
| 2004/0125800 | A1 | 7/2004 | Zellner |
| 2005/0122927 | A1 | 6/2005 | Wentink |
| 2007/0087780 | A1 | 4/2007 | Nassimi |
| 2008/0162742 | A1* | 7/2008 | Kong ..................... H04L 41/06 |
| | | | 710/19 |
| 2010/0049785 | A1 | 2/2010 | Stoyanov et al. |
| 2011/0307544 | A1 | 12/2011 | Lotlikar et al. |
| 2012/0203880 | A1 | 8/2012 | Kluyt et al. |
| 2015/0103708 | A1 | 4/2015 | Kang et al. |
| 2015/0319689 | A1 | 11/2015 | Zhang et al. |
| 2016/0142900 | A1* | 5/2016 | Sandhu ................. H04W 8/005 |
| | | | 455/435.1 |
| 2016/0156762 | A1 | 6/2016 | Bailey et al. |
| 2016/0179743 | A1 | 6/2016 | Wielicki et al. |
| 2016/0188356 | A1* | 6/2016 | Ramasamy ......... G06F 9/45533 |
| | | | 718/1 |

OTHER PUBLICATIONS

United States Patent and Trademark Office, "Non-Final Office Action", issued in connection with U.S. Appl. No. 15/637,748, dated Apr. 23, 2018, (9 pages). (Copy not provided as this is a USPTO document. Applicant will provide document upon request from Examiner).

United States Patent and Trademark Office, "Non-Final Office Action", issued in connection with U.S. Appl. No. 15/637,748, dated Aug. 2, 2018 (9 pages). (Copy not provided as this is a USPTO document. Applicant will provide document upon request from Examiner).

United States Patent and Trademark Office, "Advisory Action", issued in connection with U.S. Appl. No. 15/637,748, dated Oct. 19, 2018 (4 pages). (Copy not provided as this is a USPTO document. Applicant will provide document upon request from Examiner).

United States Patent and Trademark Office, "Non-Final Office Action", issued in connection with U.S. Appl. No. 15/637,748, dated Nov. 27, 2018 (15 pages). (Copy not provided as this is a USPTO document. Applicant will provide document upon request from Examiner).

United States Patent and Trademark Office, "Final Office Action", issued in connection with U.S. Appl. No. 15/637,748, dated Mar. 22, 2019 (14 pages). (Copy not provided as this is a USPTO document. Applicant will provide document upon request from Examiner).

United States Patent and Trademark Office, "Notice of Allowance", issued in connection with U.S. Appl. No. 15/637,748, dated Jun. 3, 2019 (5 pages). (Copy not provided as this is a USPTO document. Applicant will provide document upon request from Examiner).

* cited by examiner

US 11,074,084 B2

TECHNOLOGIES FOR OPTIMIZING RESUME TIME FOR MEDIA AGNOSTIC USB

CROSS-REFERENCE TO RELATED APPLICATION

This application is a continuation of U.S. application Ser. No. 15/637,748, entitled "TECHNOLOGIES FOR OPTIMIZING RESUME TIME FOR MEDIA AGNOSTIC USB," which was filed on Jun. 29, 2017, now U.S. Pat. No. 10,445,108.

BACKGROUND

Compute devices may be connected to several peripheral devices. Many of these devices, including devices which implement a Universal Serial Bus (USB) interface, are foregoing the wired connection in favor of devices that reduce the clutter through limiting the use of wired connections. Throughout normal use of an average compute device, users may place their compute devices in a sleep mode periodically throughout the day. In addition, the compute device may implement a power saving setting that periodically puts the compute device to sleep after a period of inactivity.

When the compute device wakes up from the sleep state, the compute device reconnects to the USB devices, which may require enumerating the various USB devices. The process of enumerating the various USB devices may take several seconds and impede the use of the USB devices right away. The effect can be compounded when a USB hub is used to further connect multiple USB differences.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
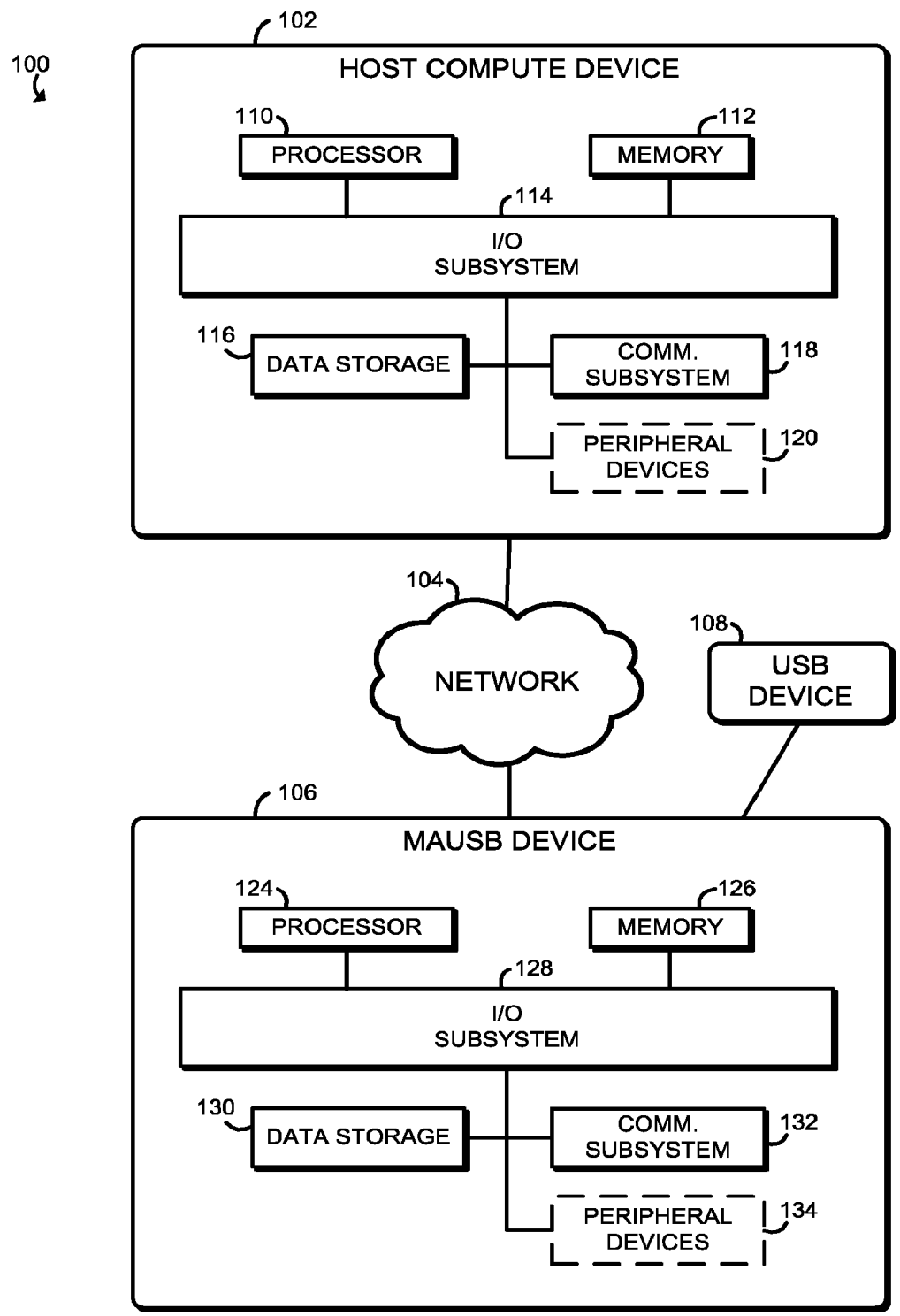
FIG. 1 is a simplified block diagram of at least one embodiment of a system for optimizing a resume time for a media agnostic USB (MAUSB) session by a compute device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for optimizing a resume time for a media agnostic universal serial bus (MAUSB) session includes a host compute device 102 and a network 104 to connect the host compute device 102 to a MAUSB device 106 which is connected to a USB device 108. Although FIG. 1 shows only one host compute device 102, one MAUSB device 106, and one USB device 108, the system 100 may include additional host compute devices 102 and MAUSB devices 106 that may be connected together via the network 104. In addition, the system may include additional USB devices 108 connected to the MAUSB device 106. In use, as described below, a host compute device 102 may establish a wireless link with a MAUSB device 106 and subsequently establish a MAUSB session with the MAUSB device 106. If the host compute device 102 enters a low power state such as a sleep state, the host compute device 102 may terminate the wireless link. However, the host compute device 102 and the MAUSB device 106 may maintain the MAUSB session, allowing the system 100 to optimize resume time of a MAUSB session when the host compute device 102 leaves the sleep state. The host compute device 102 may maintain the enumeration of all of the USB devices that are used in the MAUSB session, which improves the resume time by eliminating the time that would be needed to enumerate all of the USB devices upon restoring the link between the host compute device 102 and the MAUSB device 106.

The host compute device 102 may be embodied as any type of computation or computer device capable of performing the functions described herein, including, without limitation, a computer, a server, a rack-mounted server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As shown in FIG. 1, the host compute device 102 illustratively includes a processor 110, a memory 112, an input/output (I/O) subsystem 114, a data storage device 116, a communication subsystem 118, and/or other components and devices commonly found in a host computer or similar compute device. Of course, the host compute device 102 may include other or additional components, such as those commonly found in a host computer (e.g., various input/output devices). In some embodiments, the host compute device 102 may include peripheral devices 120. Additionally, in some embodiments, one or more of the illustrative components may be incorporated in, or otherwise form a portion of, another component. For example, the memory 112, or portions thereof, may be incorporated in the processor 110 in some embodiments.

The processor 110 may be embodied as any type of processor capable of performing the functions described herein. For example, the processor 110 may be embodied as a single or multi-core processor(s), digital signal processor, microcontroller, or other processor or processing/controlling circuit. The memory 112 may be embodied as any type of volatile or non-volatile memory or data storage capable of performing the functions described herein. In operation, the memory 112 may store various data and software used during operation of the compute device 102 such operating systems, applications, programs, libraries, and drivers. The memory 112 is communicatively coupled to the processor 110 via the I/O subsystem 114, which may be embodied as circuitry and/or components to facilitate input/output operations with the processor 110, the memory 112, and other components of the host compute device 102. For example, the I/O subsystem 114 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 114 may form a portion of a system-on-a-chip (SoC) and be incorporated, along with the processor 110, the memory 112, and other components of the host compute device 102, on a single integrated circuit chip.

The data storage device 116 may be embodied as any type of device or devices configured for short-term or long-term storage of data such as, for example, memory devices and circuits, memory cards, hard disk drives, solid-state drives, non-volatile flash memory, or other data storage devices. The host compute device 102 may also include a communications subsystem 118, which may be embodied as any communication circuit, device, or collection thereof, capable of enabling communications between the host compute device 102 and the MAUSB device over the network 104. For example, the communications subsystem 118 may be embodied as or otherwise include a network interface controller (NIC) for sending and/or receiving network data with remote devices. The communications subsystem 118 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication. It should be appreciated that, as described in more detail below, communication between the host compute device 102 and the MAUSB device 106 may be performed with use of the communications subsystem 118.

The host compute device 102 may further include one or more peripheral devices 120. The peripheral devices 120 may include any number of additional input/output devices, interface devices, and/or other peripheral devices. For example, in some embodiments, the peripheral devices 120 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

As shown in FIG. 1, the system 100 includes a network 104. The network 104 may be embodied as any type of network capable of facilitating communications between the host compute device 102 and the MAUSB device 106 and/or other remote devices. For example, the network 104 may be embodied as, or otherwise include, a wired or wireless local area network (LAN), a wired or wireless wide area network (WAN), a cellular network, and/or a publicly-accessible, global network such as the Internet. As such, the network 104 may include any number of additional devices, such as additional computers, routers, and switches, to facilitate communications thereacross.

As shown in FIG. 1, the system 100 includes a MAUSB device 106. The MAUSB device 106 may be embodied as any type of computation or computer device capable of performing the functions described herein, including, without limitation, a computer, a server, a rack-mounted server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. The MAUSB device 106 may be any device capable of implementing a protocol which allows for implementation of a Universal Serial Bus (USB) protocol, such as the USB 3.1 specification released on Jul. 26, 2013, using a physical link other than direct wires from the MAUSB device 106 to the host compute device 102. For example, the MAUSB device 106 may implement a USB protocol over an Ethernet connection, an InfiniBand® connection, a Bluetooth® connection, a Wi-Fi® connection, a WiMAX connection, a 3G connection, a 4G LTE connection, etc. The MAUSB device 106 may implement any suitable protocol or specification to do so, such as the Wireless Universal Serial Bus Specification 1.1, published Sep. 9, 2010, or the Media Agnostic Universal Serial Bus Specification 1.0a, published Jul. 29, 2015. In should be appreciated that the MAUSB device 106 is not limited to implementations such as the Media Agnostic Universal Serial Bus Specification 1.0a which explicitly use the term "media agnostic." In some embodiments, the MAUSB device 106 may be embodied as a MAUSB hub with a full tree of USB devices 108. In other embodiments, the MAUSB device 106 may be embodied as a singular MAUSB device 106 that is linked to the hosts compute device 102. As shown in FIG. 1, the MAUSB device 106 includes a processor 124, a memory 126, an input/output (I/O) subsystem 128, a data storage 130, a communication subsystem 132, and/or other components and devices commonly found in a MAUSB device or similar compute device. Of course the MAUSB device 106 may include other or additional components, such as those commonly found in a MAUSB device (e.g. various input/output devices), in other embodiments. In some embodiments, the MAUSB device 106 may include peripheral devices 134. It should be appreciated that the peripheral devices 134 may be integrated into the MAUSB device 106 and form a core component of the functionality of the MAUSB device 106. For example, the MAUSB device 106 may be embodied as a printer, and the peripheral device 134 may be embodied as the physical component capable of printing ink onto a sheet of paper. In the illustrative embodiment, the MAUSB device 106 includes similar components to the host compute device 102. The components of the MAUSB device 106 are similarly embodied as the components of the host compute device 102. Additionally, in some embodiments, one or more of the illustrative components may be incorporated in, or otherwise form a portion of, another component. For example, the memory 126, or portions thereof, may be incorporated in the processor 124 in some embodiments. Of course, it should be appreciated that, in many embodiments, the processor 124, the memory 126, etc., of the MAUSB device 106 may be less powerful than the corresponding processor 110, the memory 122, etc. in the host compute device 102.

As shown in FIG. 1, the system 100 includes a USB device 108 that is connected to the MAUSB device 106. In other embodiments, there may be any number of USB devices connected to the MAUSB device 106 and/or directly to the host compute device 102. The USB device 108 may be embodied as any USB device capable of performing the functions described herein.

Figure 2:
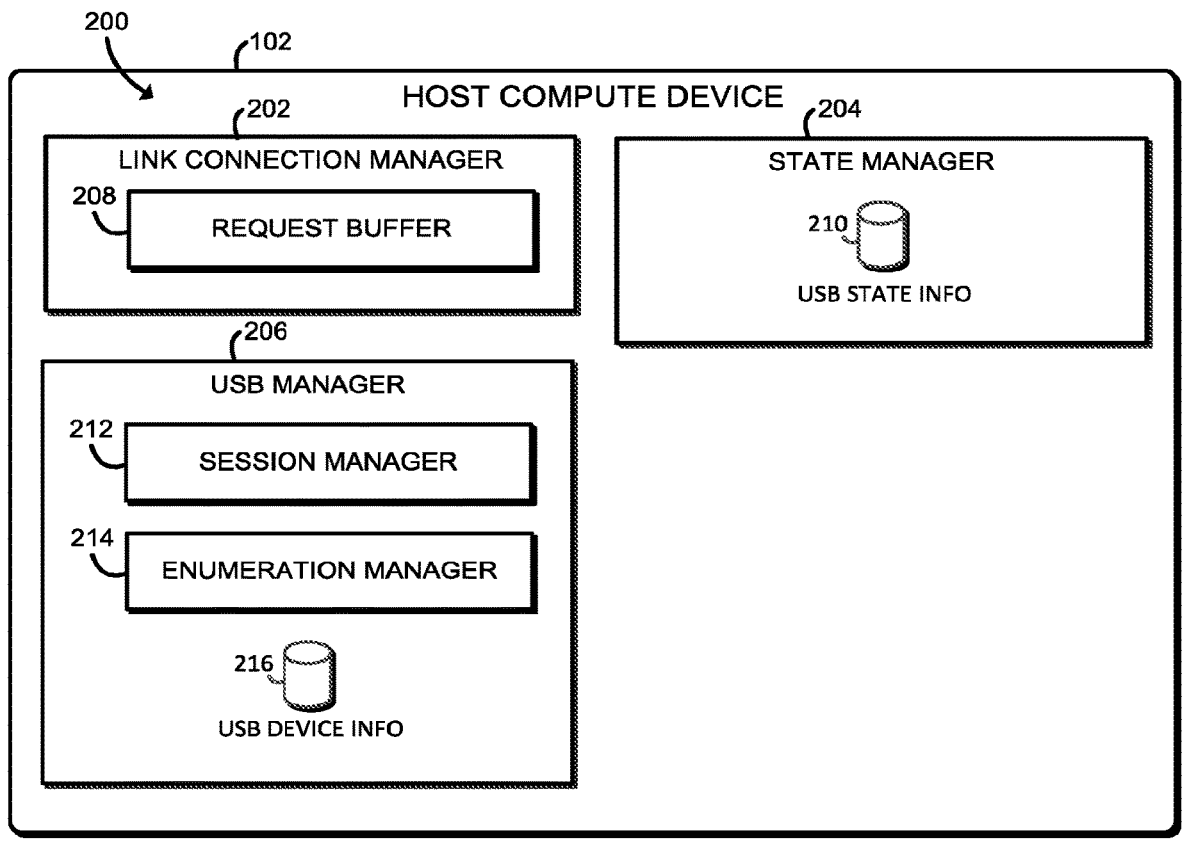
FIG. 2 is a simplified block diagram of at least one embodiment of an environment of a host compute device of FIG. 1.

Referring now to FIG. 2, in an illustrative embodiment, the host compute device 102 may establish an environment 200 during operation. The illustrative environment 200 includes a link connection manager 202, a state manager 204, and a USB manager 206. The various components of the environment 200 may be embodied as hardware, firmware, software, or a combination thereof. For example, the various modules, logic, and other components of the environment 200 may form a portion of, or otherwise be established by, the processor 110 or other hardware components of the host compute device 102 such as the memory 112. As such, in some embodiments, one or more of the components of the environment 200 may be embodied as circuitry or collection of electrical devices (e.g., a link connection manager circuit 202, a state manager circuit 204, a USB manager circuit 206, etc.). It should be appreciated that, in such embodiments, one or more of the circuit (e.g., the link connection manager circuit 202, the state manager circuit 204, the USB manager 206 circuit, etc.) may form a portion of the processor 110, the memory 112, the I/O subsystem 114, and/or other components of the host compute device 102. Additionally, in some embodiments, one or more of the illustrative components may form a portion of another component and/or one or more of the illustrative components may be independent of one another. Also, although illustrated as being established by a single host compute device 102, in some embodiments, the environment 200 may be established by several host compute devices 102 in communication over the network 104. Further, in some embodiments, one or more of the components of the environment 200 may be embodied as virtualized hardware components or emulated architecture, which may be established and maintained by the processor 110 or other components of the host compute device 102.

The link connection manager 202 is configured to manage a physical communication link with the MAUSB device 106. In the illustrative embodiment, the link connection manager 202 includes a request buffer 208. The link connection manager 202 may establish a link with the MAUSB device 106. The link may be embodied as any physical connection that allows the host compute device 102 to communicate with the MAUSB device 106, such as a connection over Ethernet, InfiniBand®, Bluetooth®, Wi-Fi®, WiMAX, 3G, 4G LTE, etc. In some embodiments, the link connection manager 202 may terminate the link with the MAUSB device 106 for various reasons, such as when the host compute device 102 enters a low-power sleep state, as discussed in more detail below. When the host compute device 102 wakes up and exits the low-power sleep state, the link connection manager 202 may reestablish the link with the MAUSB device 106.

As discussed in more detail below, the USB manager 206 may send a wake request to the link connection manager 202 to be sent to the MAUSB device 106 after the compute device 102 exits the low-power sleep state. The request buffer 208 is configured to provide a buffer for the wake request in order to allow time for the MAUSB device 106 to reestablish the link. It should be appreciated that the request buffer 208 may receive the wake request before the link connection manager 202 has reestablished the link. The link connection manager 202 may buffer the wake request for a certain amount of time, and, if a link has not been reestablished in that amount of time, the link connection manager 202 may drop the wake request and notify the USB manager 206 of the error.

The state manager 204 is configured to control the power state for the host compute device 102. In the illustrative embodiment, the state manager 204 includes a USB state information storage 210. The USB state information storage 210 may be embodied as any type of device or devices configured for short-term or long-term storage of data such as, for example, memory devices and circuits, memory cards, hard disk drives, solid-state drives, non-volatile flash memory, or other data storage devices. The state manager 204 manages the power state of the host compute device 102 and transitions the host compute device 102 from the various states (active, inactive, sleep, etc.) to another state. The various states may define certain characteristics of one or more components of the compute device 102, such as the processor 110, the memory 112, the communication subsystem 118, etc. For example, depending on the state, the processor 110 may flush the cache, suspend execution of instructions, be powered down, etc., and the memory 112 may remain powered or the information in the memory 112 may be saved to disk. Additionally, depending on the state, power to certain components such as the communication subsystem 118 may be turned off. As used herein, the sleep state refers to a state in which the processor 110 is in a reduced power usage state or completely turned off, the communication subsystem 118 is turned off or in a reduced power usage state. In the illustrative embodiment, the memory 112 remains powered in the sleep state. In other embodiments, the contents of the memory 112 may be copied to non-volatile storage such as the data storage device 116, and then the memory 112 may be powered down for the sleep state. It should be appreciated that, in such embodiments, the contents of the memory 112 stored in the data storage device 116 may be copied back to the memory 112 as part of transitioning from the sleep state to a wake state. The state manager 204 may receive a sleep command for the host compute device 102. For example, the sleep command may be an input received by the host compute device 102 from the user to enter a sleep mode or the sleep command may be generated by the state manager 204 if no input is received from the user after a certain period of time. After the state manager 204 receives the sleep command for the host compute device 102, the state manager 204 may transition the host compute device 102 into a sleep state, which may include notifying other components of the compute device 102 such as the link connection manager 202 and the USB manager 206 of the sleep command. While in the sleep state, the state manager 204 may receive a wake command for the host compute device 102, such as by an input from the user to power on the host compute device 102 or a request received by the communication subsystem 118. The state manager 204 may then transition the host compute device 102 from a sleep state to an active state and notify other components of the host compute device 102 of the transition, such as the link connection manager 202 and the USB manager 206.

The USB state information storage 210 is configured to store data regarding the state of the MAUSB device 106 and any other USB devices 108 in the established session. For example, the USB state information storage 210 stores data indicating whether the MAUSB device 106 is in a sleep state, active state, etc. The data may be used by the host compute device 102 to determine whether to terminate the session with the MAUSB device 106 as described in more detail down below.

The USB manager 206 is configured to establish and maintain a MAUSB session with the MAUSB device 106 and any other USB devices 108 used in the session. In the illustrative embodiment, the USB manager 206 includes a session manager 212, an enumeration manager 214, and a USB device information storage 216. It should be appreciated that any of the components of the USB manager 206 may be combined to simplify the design of the USB manager 206. For example, the session manager 212 and the enumeration manager 214 may be combined to be one manager to handle the enumeration and session management.

The session manager 212 is configured to establish, manage, and terminate a session with the MAUSB device 106. The session manager 212 may send an initialize session message to the MAUSB device 106 after the link connection manager 202 has established the link to the MAUSB device 106 through the link connection manager 202. The session manager 212 may wait for a message confirming receipt of the initialization before completion of the initialization process of the session. Alternatively, the session manager 212 may initialize the session with the MAUSB device 106 after sending the initialize session message. After the session is established, the session manager 312 may facilitate the operation of the MAUSB device 106 by sending and receiving messages. As discussed above, the state manager 204 may transition the host compute device 102 to a sleep state, and notify other components such as the session manager 312 of the transition. In response to a notification of the transition to a sleep state, the session manager 312 may send a sleep request to the MAUSB device 106, notifying the MAUSB device 106 that the host compute device 102 is going to sleep. The session manager 312 may then transition the session to a persistent inactive state while the host compute device 102 is asleep. It should be appreciated that the session manager 312 may not terminate the session even if the physical link connection established by the link connection manager 202 is terminated when the host compute device 102 goes to a sleep state.

When the compute device 102 wakes up, the state manager 204 may send a notification to other components such as the session manager 212 notifying them of the transition. In response to the notification, the session manager 212 may send a wake request to the MAUSB device 106 to the link connection manager 202 to handle the wake request and send to the MAUSB device 106. As discussed above, the link connection manager 202 may buffer the wake request until the link to the MAUSB device 106 is reestablished. The session manager 212 waits to receive a response to the wake request from the MAUSB device 106. The session manager may reactive the session with the MAUSB device 106 from a sleep state or persistent inactive state to the active state if the MAUSB device 106 responds with an acceptance of the wake request. Alternatively, the session manager 212 may terminate the session if the MAUSB device 106 responds with an error to the wake request, if the MAUSB device 106 does not respond at all, or if the wake request cannot be sent. The error may be a result of a power cycle of the MAUSB device 106. The session manager 212 may proceed with establishing a new session with the MAUSB device 106 after the session has been terminated. In some embodiments, if the link connection manager 202 establishes a connection to an MAUSB device 106, the session manager 212 may check whether it is the same MAUSB device 106 associated with the session, such as by comparing the media access control (MAC) address of the MASUBS device 106 associated with the session and the MAC address of the new MAUSB device 106. If the MAC addresses are not the same, the session manager 212 will terminate the session.

The enumeration manager 214 is configured to handle the enumeration of the MAUSB device 106 and USB device 108 for use in the established session with the host compute device 102. After the session is established by the session manager 212, the enumeration manager 214 proceeds with enumeration of any MAUSB device 106 or USB device 108 to be established in the enumeration tree for the established session. After enumeration, the enumeration manager 214 may store the data in the USB device information storage 216. The USB device information storage 216 may be embodied as any type of device or devices configured for short-term or long-term storage of data such as, for example, memory devices and circuits, memory cards, hard disk drives, solid-state drives, non-volatile flash memory, or other data storage devices.

Figure 3:
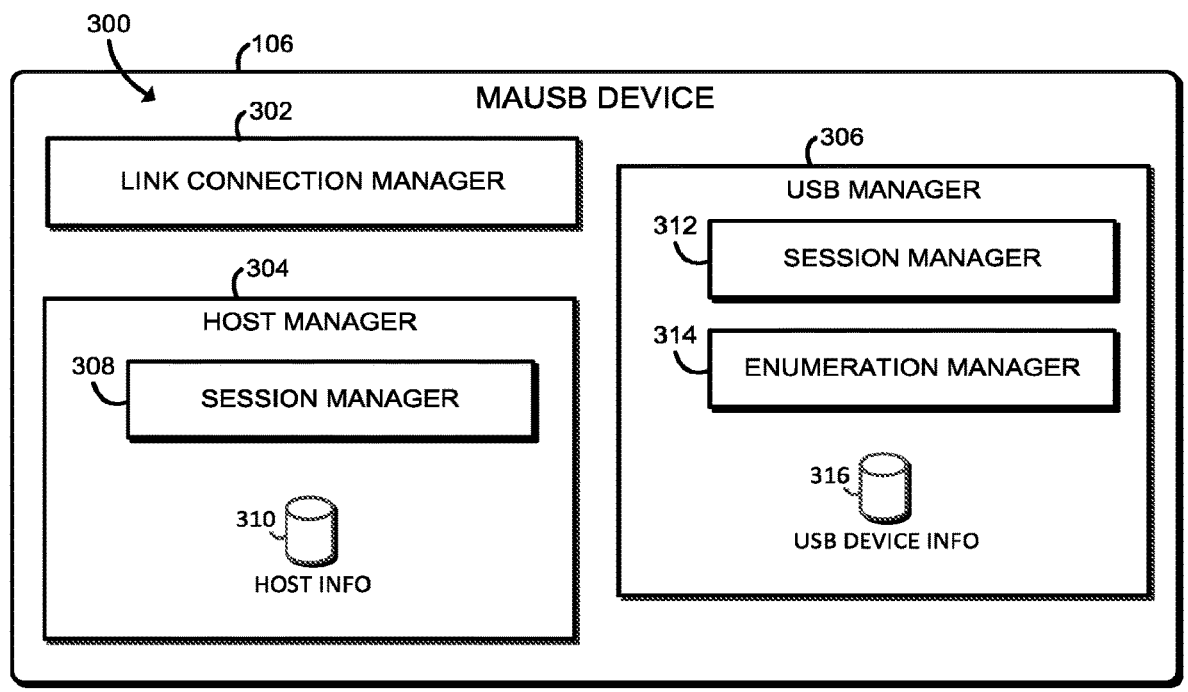
FIG. 3 is a simplified block diagram of at least one embodiment of an environment of an MAUSB device of FIG. 1.

Referring now to FIG. 3, in an illustrative embodiment, the MAUSB device 106 may establish an environment 300 during operation. The illustrative embodiment 300 includes a link connection manager 302, a USB manager 304, and a host manager 306. The various components of the environment 300 may be embodied as hardware, firmware, software, or a combination thereof. For example, the various modules, logic, and other components of the environment 300 may form a portion of, or otherwise be established by, the processor 124 or other hardware components of the MAUSB device 106 such as the memory 126. As such, in some embodiments, one or more of the components of the environment 300 may be embodied as circuitry or collection of electrical devices (e.g., a link connection manager circuit 302, a host manager circuit 304, a USB manager 306, etc.). It should be appreciated that, in such embodiments, one or more of the circuit (e.g., the link connection manager circuit 302, the host manager 30 circuit, the USB manager circuit 306, etc.) may form a portion of the processor 124, the memory 126, the I/O subsystem 128, and/or other components of the MAUSB device 106. Additionally, in some embodiments, one or more of the illustrative components may form a portion of another component and/or one or more of the illustrative components may be independent of one another. Also, although illustrated as being established by a single MAUSB device 106, in some embodiments the environment 300 may be established by several MAUSB devices 106 in communication over the network 104. Further, in some embodiments, one or more of the components of the environment 300 may be embodied as virtualized hardware components or emulated architecture, which may be established and maintained by the processor 124 or other components of the MAUSB device 102.

The link connection manager 302 is configured to manage a link with the host compute device 102. Similarly to the link connection manager 202 of the host compute device 102, the link connection manager 302 of the MAUSB device 106 handles the establishing and terminating of the link for the MAUSB device 106. For instance, the link connection manager 302 may establish a link with the host compute device 102, such as a connection over Ethernet, InfiniBand®, Bluetooth®, Wi-Fi®, WiMAX, 3G, 4G LTE, etc. In some embodiments, the link connection manager 302 may terminate the link for various reasons, such as when the host compute device 102 enters a low-power sleep state. When the host compute device 102 wakes up and exits the low-power sleep state, the link connection manager 302 may reestablish the link with the host compute device 102.

The host manager 304 is configured to establish and maintain an MAUSB session with the host compute device 102, similar to the USB manager 206 of the host compute device 102. In the illustrative embodiment, the Host manager 306 includes a session manager 312, an enumeration manager 314, and a USB device information storage 316. It should be appreciated that any of the components of the Host manager 306 may be combined to simplify the design of the Host manager 306. For example, the session manager 312 and the enumeration manager 314 may be combined to be one manager to handle the enumeration and session management. It should be appreciated that, in some embodiments, the MAUSB device 106 may be connected to one or more USB devices 108 or other MAUSB devices 106, such as when the MAUSB device 106 is embodied as a hub. In such embodiments, the Host manager 306 may perform the same functions discussed above for the USB manager 206. The Host manager 306 may act as an intermediary to the USB manager 206 and the additional USB device 108.

The session manager 308 is configured to establish, manage, and terminate a session with the host compute device 102. The session manager 308 is configured to operate as a complement to the session manager 212. Accordingly, the session manager 308 may receive an initialize session message from the host compute device 102 and send a confirmation of the initialization to the host compute device 102. The session manager 308 may facilitate operation of the MAUSB device 102 by sending and receiving messages. In response to receiving a sleep request, the session manager 308 may place the MAUSB session into a persistent inactive state and wait for a wake request from the host compute device 102. It should be appreciated that the session manager 308 may not terminate the session even if the physical link connection established by the link connection manager 302 is terminated when the host compute device 102 goes to a sleep state.

When the host compute device 102 wakes from the sleep state, it may reestablish a physical link connection with the MAUSB device 106 and send a wake request. The session manager 308 may send an acceptance of the wake request and transition the MAUSB session to an active state. If the MAUSB device 106 reestablishes a physical link with the host compute device 102 but does not receive a wake request, the MAUSB device 106 may terminate the MAUSB session. For example, the MAUSB device 106 may receive an initialization message instead of a wake request, which would indicate that the host compute device 102 has terminated the previous MAUSB session due to, e.g., the host compute device power cycling. Additionally, the session manager 304 may check whether the host compute device 102 the MAUSB device 106 is connected to is the same host compute device 102 associated with the session, such as by comparing the media access control (MAC) address of the host compute device 102 associated with the session and the MAC address of the new host compute device 102. If the MAC addresses are not the same, the session manager 308 will terminate the session.

The host information storage 310 is configured to store data regarding the state of the MAUSB session that has been established with the host compute device 102. For example, the host information storage 310 may store data indicating a state of the host compute device 102, a state of the MAUSB session, information related to the host compute device such as the MAC address, etc.

The USB manager 306 is configured to establish and maintain a MAUSB session with any other MAUSB device 106 and any other USB devices 108 used in the session. The USB manager 306 may be embodied as a cloud service or user process on the MAUSB device 106. Similarly to the USB manager 206 of the host compute device 102, the USB manager 306 of the MAUSB device 106 is used to manage the session and the USB devices 108 used in that session. In the illustrative embodiment, the USB manager 306 includes a session manager 312, an enumeration manager 314, and a USB device information storage 316. It should be appreciated that any of the components of the USB manager 306 may be combined to simplify the design of the USB manager 306. For example, the session manager 312 and the enumeration manager 314 may be combined to be one manager to handle the enumeration and session management. Similarly to the functionality of the USB manager 206, the USB manager 306 and its corresponding may perform the same functions discussed above for the USB manager 206 and its corresponding components. The USB manager 306 may act as an intermediary to the USB manager 206 and the additional USB device 108.

Figure 4:
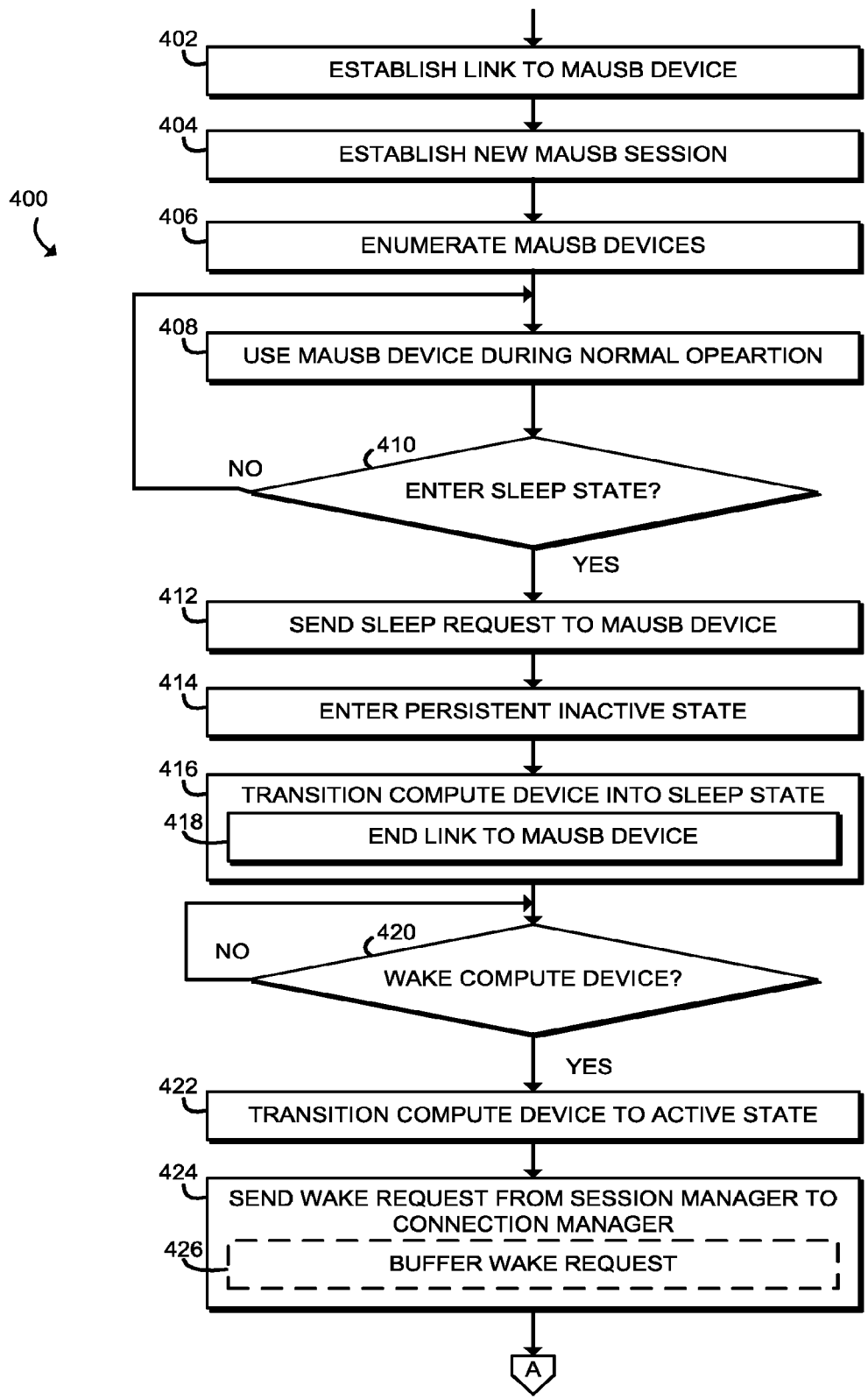
FIGS. 4 and 5 are a simplified flow diagram of at least one embodiment of a method for optimizing a resume time for a MAUSB session that may be executed by the host compute device of FIGS. 1 and 2.
Figure 5:
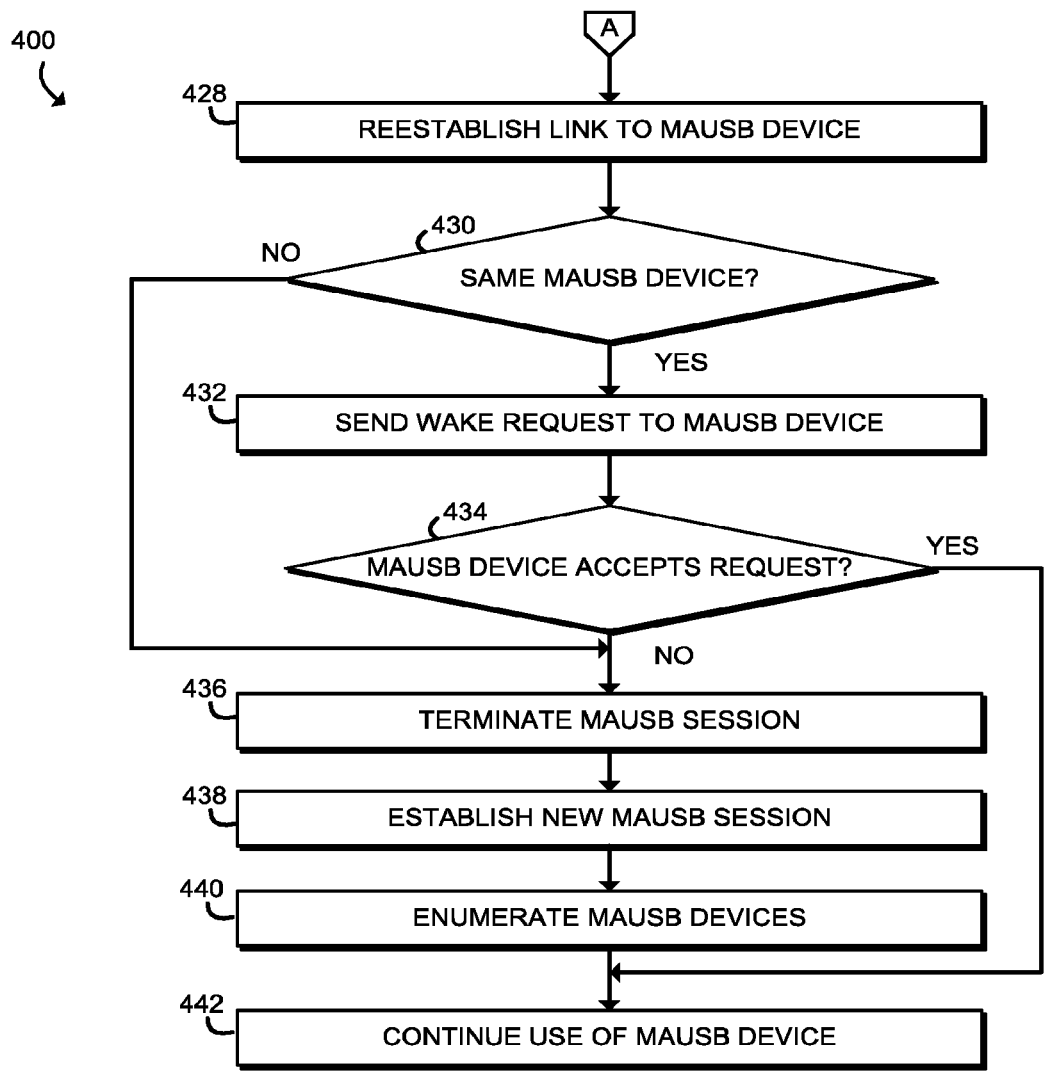

Referring now to FIGS. 4 and 5, in use, the host compute device 102 may execute a method for optimizing the resume time for a MAUSB session. It should be appreciated that, in some embodiments, the operations of the method 400 may be performed by one or more components of the environment 200 of the host compute device 102 as shown in FIG. 2. The method 400 begins in block 402, in which the host compute device 102 establishes a link to an MAUSB device 106. The link to the MAUSB device 106 may be a wireless communication link such as a WiFi link, a Bluetooth link, etc. In block 404, the host compute device 102 establishes a new MAUSB session with the MAUSB device 106. As detailed above, the host compute device 102 may send an initialization message to establish the session with the MAUSB device 106. The link is a connection between the host compute device 102 and the MAUSB device 106, whereas the session maintains what devices are being used within the session. For example, the session is a record of which MAUSB devices 102 and USB devices 108 are in a session with the host compute device 102.

In block 406, the host compute device 102 enumerates the MAUSB device 106 and the USB devices 108 in a tree enumeration. The tree enumeration may be a web of USB devices 108 connected to various hubs or MAUSB devices 106. The tree enumeration maintains a record of which and how many MAUSB devices 106 and/or USB devices 108 are in the established session.

In block 408, the host compute device 102 uses the MAUSB device 106 and the USB devices 108 during normal operation. For instance, the host compute device 102 may accept input from the MAUSB device 106, send output to the MAUSB device 106, send commands to the MAUSB device 106, etc. In block 410, the host compute device 102 determines if the host compute device 102 has received a sleep command. In some embodiments, the sleep command may be inputted by the user to put the host compute device to a sleep state. Additionally or alternatively, the sleep command may be an automatic function of the host compute device 102 for when the battery of the device reaches to a critical threshold or when no input has been provided to the host compute device 102 for a certain period of time. If there is no sleep command received, then the method loops back to block 408 to continue operation of the MAUSB device. However, if there is a sleep command input received, then the method 400 advances to block 412.

In block 412, the host compute device 102 sends a sleep request to the MAUSB device 106. In some embodiments, the host compute device 102 may wait for an acknowledgement from the MAUSB device 106 that the sleep request was received. In alternative embodiments, the host compute device 102 proceeds to block 414 after sending the sleep request to the MAUSB device 106.

In block 414, the host compute device 102 sets the MAUSB session to a persistent inactive state. The persistent inactive state may indicate that the session is still intact between the host compute device 102 and the MAUSB device 106 despite being inactive momentarily.

In block 416, the host compute device 102 transitions to a sleep state. In the illustrative embodiment, the host compute device 102 also ends the link to the MAUSB device 106, ending the wireless connection between the host compute device 102 and the MAUSB device 106.

In block 420, the host compute device 102 determines if there is a wake command received from an input by the system 100. In some embodiments, the user my input the wake command by turning on the host compute device 102. However, in other embodiments the wake command may be generated periodically to ensure updates are received by the host compute device 102. If there are no wake commands received, then the method 400 loops back to the beginning of block 420 to continually check for a wake command. Alternatively, if the host compute device 102 receives a wake command, then the method advances to block 422.

In block 422, the host compute device 102 transitions from the sleep state to an active state. Subsequently, in block 424, the host compute device 102 sends a wake request from the session manager a link connection manager of the host compute device 102 as described above. In some embodiments, in block 426, the host compute device 102 buffers the wake request to be sent to the MAUSB device 106, such as when the communication link to the MAUSB device 106 has not yet been reestablished. In other embodiments, the communication link may be reestablished before the wake request is received by the link connection manager, in which case the wake request may be sent to the MAUSB device 106 without buffering.

In block 428, the host compute device 102 reestablishes a link to an MAUSB device 106. It should be appreciated that the host compute device 102 may not necessarily establish a link with the same MAUSB device 106. Of course, in some embodiments, no link may be available, in which case the host compute device 102 would not establish a link with any MAUSB device. In block 430, the host compute device 102 determines if the link is established with the same MAUSB device 106. If the link was established with the same MAUSB device 106, then the method 400 advances to block 432. However, if the link was established with a different MAUSB device 106 (or if no MAUSB device 106 was available to link with), the method 400 branches ahead to block 436, in which the host compute device 102 terminates the MAUSB session.

When the host compute device 102 reestablishes the link with the same MAUSB device 106, in block 432 the host compute device 102 sends the wake request to the MAUSB device 106. In block 434, the host compute device 102 waits to receive a response from the MAUSB device 106 as described above. If the MAUSB device 106 accepts the wake request, then the method 400 branches ahead to block 442. However, if the MAUSB device 106 sends an error to the wake request or does not respond at all, then the method 400 advances to block 436.

In block 436, the host compute device 102 terminates the MAUSB session by identifying that there is an error with the MAUSB device 106. An example of when an error could occur may be when the MAUSB device 106 goes through a power cycle and has not saved the MAUSB session information. In block 438, the host compute device 102 establishes a new MAUSB session with the MAUSB device 106. After establishing the new MAUSB session, the host compute device 102 enumerates the MAUSB devices 102 in block 440. The host compute device 102 may enumerate any amount of MAUSB devices 102 or USB devices 108 in a USB tree enumeration as described above.

In block 442, the host compute device 102 continues the use of the MAUSB device 106. In the case that the host compute device reactivates the previous session with the MAUSB device 106, the host compute device 102 continues the session with the MAUSB device 106. In the case when a new session was established with either the same or different MAUSB device 106, then the host compute device begins use and session with the MAUSB devices 106.

Figure 6:
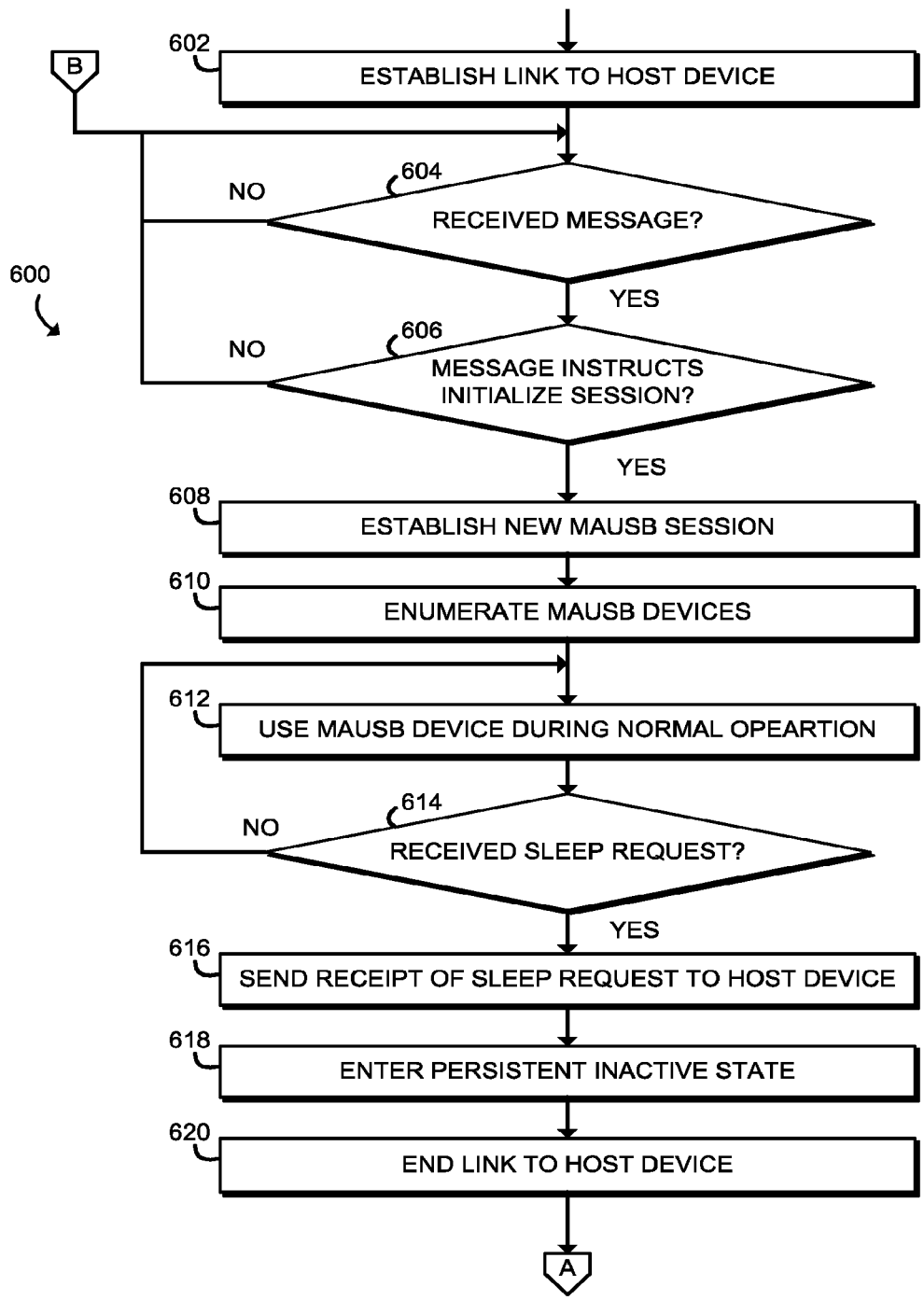
FIGS. 6 and 7 are a simplified flow diagram of at least one embodiment of a method optimizing a resume time for a MAUSB session that may be executed by the MAUSB device of FIGS. 1 and 3.
Figure 7:
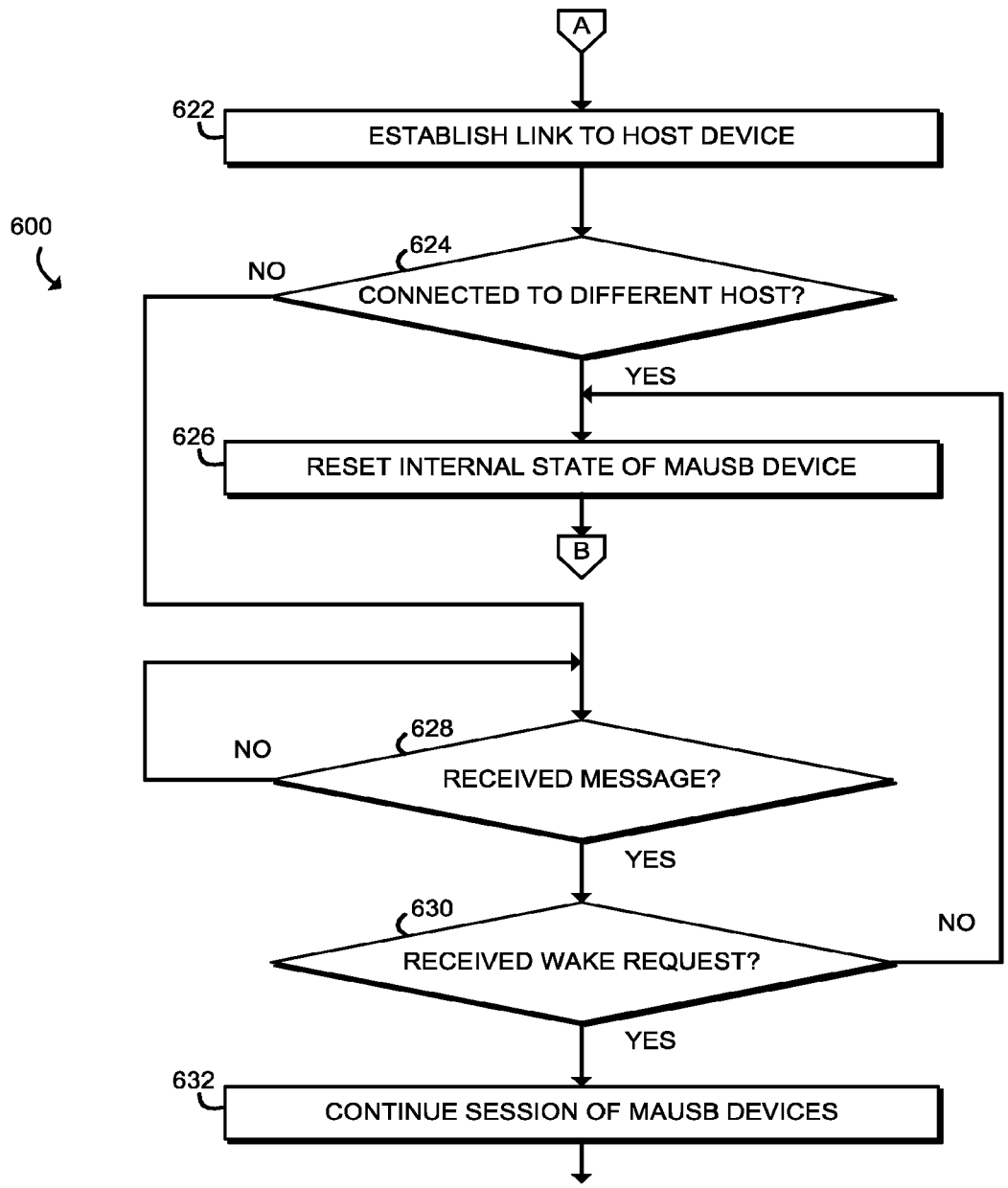

Referring now to FIGS. 6 and 7, in use, the MAUSB device 106 may execute a method 600 for optimizing resume time for a MAUSB session. It should be appreciated that, in some embodiments, the operations of the method 600 may be performed by one or more components of the environment 300 of the MAUSB device 102 as shown in FIG. 3. The method 600 mirrors some of the operations of method 400 since these two methods may be running concurrently. It would be apparent that the methods 400 and 600 may be executed together by a system 100 that includes both the host compute device 102 and the MAUSB device 106. The method 600 begins in block 602, in which the MAUSB device 106 establishes a link with a host compute device 102 as described above.

In block 604, the MAUSB device 106 determines if a message is received from the host compute device 102. In the case that no message is received, the method 600 loops back around to block 604 to continue monitoring for a message received from the host compute device 102. When a message is received, the method 600 advances to block 606.

In block 606, the MAUSB device 106 determines whether the message received by the host compute device 102 is an instruction to initialize the session. This message may be sent during the first connection between a host compute device 102 and a MAUSB device 106. In other embodiments, the message may be sent every time the host compute device 102 connects to the MAUSB device 106. If the message does not provide an instruction to initialize the session, the method 600 loops back to the beginning of block 604 to continue monitoring for messages received from the host compute device 102. In some embodiments, the MAUSB device 102 may send an error message to the host compute device 102 if an unexpected message (i.e., a message other than a message to initialize a session) is received. If the message received from the host compute device 102 provides an initialization of the session, then the method 600 advances to block 608.

In block 608, the MAUSB device 106 establishes a new MAUSB session with the host compute device 102. After the establishment of the new MAUSB session with the host compute device, the MAUSB device 106 enumerates any number of MAUSB devices 106 and any number of USB devices 108 in block 610. In other embodiments, the host compute device 102 may enumerate the MAUSB devices 106 and USB devices 108. Alternatively, the enumeration may be performed by the combination of the host compute device 102 and the MAUSB device 106. For example, in the case the MAUSB device 106 acts as a hub, the MAUSB device 106 may enumerate the USB devices 108 connected to it and the host compute device 102 may enumerate other MAUSB devices 106 and USB devices 108.

In block 612, the host compute device 102 uses the MAUSB device 106 during normal operation. This may include the host compute device 102 using the full USB tree enumeration as described above from the web of MAUSB devices 106 and USB devices 108 that may be enumerated during the session.

In block 614, the MAUSB device 106 determines if a sleep request is received form the host compute device 102. If a sleep request is not received, then the method 600 loops back to block 612 and continues the normal operation. When the MAUSB device 106 receives a sleep request then the method 600 advances to block 616.

In block 616, the MAUSB device 106 sends a receipt of the sleep request to the host compute device 102 to notify the host that the sleep request is acknowledged. The MAUSB device 106 proceeds to enter the persistent inactive state in block 618. After the MAUSB device 106 enters the persistent inactive state, the method 600 advances to block 620 where the link to the host compute device 102 is terminated. Even though the link is ended, the session remains intact. In some embodiments, the link to the host compute device 102 may remain active even when the MAUSB session is in the persistent inactive state.

In block 622, the MAUSB device 106 establishes a link to the host compute device 102, which may happen after the host compute device 102 has transitioned out of a sleep state. In block 624, the MAUSB device 106 determines if it is connected to a different host. If the MAUSB device 106 is not connected to a different host, then the method 600 branches off and continues to block 628. However, if it is determined that the MAUSB device 106 is connected to a different host, then the method 600 advances to block 626.

In block 626, the MAUSB device 106 resets the internal state of the MAUSB device 106 to prepare for a session with the new host compute device 102. After resetting the internal state of the MAUSB device 106, the method 600 returns to block 604 to determine if the MAUSB device 106 has received a message from the new host compute device 102.

In block 628, the MAUSB device 106 determines if a message has been received from the host compute device 102. If no message has been received, the MAUSB device 106 loops back around to continue monitoring for a received message. When there is a message received, the method 600 advances to block 630.

In block 630, the MAUSB device 106 determines if the message received was a wake request. If the message was not a wake request, then the method 600 returns to block 626 to reset the internal state of the MAUSB device 106. In some embodiments, when the message is detected as not a wake request, the MAUSB device 106 may send an error message to the host compute device 102. If, however, the message was a wake request, then the method 600 proceeds to block 634.

In block 634, the MAUSB device 106 continues the session of MAUSB devices 106. The host compute device 102 may proceed to continue the previous session before the transitioning to the sleep state.

In some embodiments, the MAUSB device 106 may execute a power cycle at any time during the method 600. As a result, the method 600 would return to the block 602 to reestablish the link to the host compute device 102. Furthermore, the MAUSB device 106 may send an error message in response to any wake request received from the host compute device 102. The host compute device 102 would subsequently terminate the session and reestablish the session with the MAUSB device 106 and any other USB devices 108 in the full USB tree enumeration established in the previous session.

It should be appreciated that, in some embodiments, the methods 400 and/or 600 may be embodied as various instructions stored on a computer-readable media, which may be executed by the processor 110, the I/O subsystem 114, and/or other components of the host compute device 102 and by the processor 124, the I/O subsystem 128, and/or other components of the MAUSB device 106 to cause the host compute device 102 and/or the MAUSB device 106 to perform the respective method 400 and/or 600 respectively. The computer-readable media may be embodied as any type of media capable of being read by the host compute device 102 and MAUSB device 106 including, but not limited to, the memory 112 or 126, the data storage device 116 or 130, firmware devices, other memory or data storage devices of the host compute device 102, portable media readable by a peripheral device 120 of the host compute device 102 or by a peripheral device 134 of the MAUSB device 106, and/or other media.

EXAMPLES

Illustrative examples of the technologies disclosed herein are provided below. An embodiment of the technologies may include any one or more, and any combination of, the examples described below.

Example 1 includes a compute device for operating a media agnostic universal serial bus (MAUSB) device, the compute device comprising a link connection manager to establish a link with the MAUSB device; a USB manager to establish an MAUSB session with the MAUSB device; and a state manager to receive a sleep command for the compute device, wherein the USB manager is further to send, in response to receipt of the sleep command, a sleep request to the MAUSB device, wherein the link connection manager is further to terminate the link with the MAUSB device in response to receipt of the sleep command, wherein the state manager is further to (i) transition, in response to receipt of the sleep command, the compute device into a sleep state; (ii) receive a wake command for the compute device, and (iii) transition, in response to receipt of the wake command, the state of the compute device from the sleep state to an active state, wherein the USB manager is further to send, in response to receipt of the wake command, a wake request for the MAUSB device to the link connection manager, wherein the link connection manager is further to (i) reestablish the link with the MAUSB device, (ii) send the wake request to the MAUSB device, and (iii) receive a response to the wake request from the MAUSB device, and wherein the USB manager is further to continue the MAUSB session with the MAUSB device when the response to the wake request is an acceptance of the wake request, and wherein the USB manager is further to terminate the MAUSB session when the response to the wake request is not an acceptance of the wake request.

Example 2 includes the subject matter of Example 1, and wherein the USB manager is further to enumerate the MAUSB device subsequently to establishment of the MAUSB session with the MAUSB device.

Example 3 includes the subject matter of any of Examples 1 and 2, and wherein to enumerate the MAUSB device comprises to enumerate a full tree of USB devices for the MAUSB session.

Example 4 includes the subject matter of any of Examples 1-3, and wherein to transition the compute device into the sleep state comprises to place the MAUSB session into a persistent inactive state.

Example 5 includes the subject matter of any of Examples 1-4, and wherein to send the wake request to the MAUSB device comprises to buffer the wake request before the wake request is sent to the MAUSB device.

Example 6 includes the subject matter of any of Examples 1-5, and wherein the USB manager is further to establish a new MAUSB session with a new MAUSB device and terminate the MAUSB session with the MAUSB device.

Example 7 includes the subject matter of any of Examples 1-6, and wherein the USB manager is further to enumerate the new MAUSB device subsequently to establishment of the new MAUSB session with the new MAUSB device.

Example 8 includes the subject matter of any of Examples 1-7, and wherein to enumerate the MAUSB device comprises to enumerate a full tree of USB devices for the new MAUSB session.

Example 9 includes the subject matter of any of Examples 1-8, and wherein the USB manager is further to establish a new MASUB session with the MAUSB device in response to termination of the MAUSB session when the response to the wake request is not an acceptance of the wake request.

Example 10 includes the subject matter of any of Examples 1-9, and wherein the USB manager is further to enumerate the MAUSB device in response to establishment of the new MAUSB session with the MAUSB device.

Example 11 includes the subject matter of any of Examples 1-10, and wherein to enumerate the MAUSB device comprises to enumerate a full tree of USB devices for the new MAUSB session.

Example 12 includes a media agnostic universal serial bus (MAUSB) device, the MAUSB device comprising a link connection manager to establish a link with a host compute device; and a host manager to establish an MAUSB session with the host compute device; wherein the link connection manager is further to (i) receive a sleep request for the MAUSB device from the host compute device, (i) terminate the link with the host compute device, (iii) reestablish the link with the host compute device after termination of the link, and (iv) receive a message from the host compute device after reestablishment of the link, and wherein the host manager is further to send an acceptance to the message to the host compute device if the message is a wake request, and wherein the host manager is further to send an error to the message to the host compute device if the message is not a wake request.

Example 13 includes the subject matter of Example 12, and wherein the host manager is further to wait for a message from the host compute device to initialize the session subsequent to the establishment of the link to the host compute device.

Example 14 includes the subject matter of any of Examples 12 and 13, and wherein the MAUSB device further comprises a USB manager to enumerate one or more USB devices subsequent to the establishment of the session with the host compute device.

Example 15 includes the subject matter of any of Examples 12-14, and wherein the host manager is further to place the MAUSB session into a persistent inactive state.

Example 16 includes the subject matter of any of Examples 12-15, and wherein the link connection manager is further to establish a new link with a new host compute device.

Example 17 includes the subject matter of any of Examples 12-16, and wherein the host manager is further to wait for a message from the new host compute device to initialize the session subsequent to the establishment of the new link to the new host compute device.

Example 18 includes the subject matter of any of Examples 12-17, and wherein the state manager is further to reset an internal state of the MAUSB device subsequent to establishment of the new link to the new host compute device.

Example 19 includes the subject matter of any of Examples 12-18, and wherein the state manager is further to reset an internal state of the MAUSB device subsequent to the identification the message is not a wake request.

Example 20 includes a method for operating a media agnostic universal serial bus (MAUSB) device by a compute device, the method comprising establishing, by the compute device, a link with the MAUSB device; establishing, by the compute device, an MAUSB session with the MAUSB device; receiving, by the compute device, a sleep command for the compute device; sending, by the compute device, a sleep request to the MAUSB device in response to receiving the sleep command; terminating, by the compute device, the link with the MAUSB device in response to receiving the sleep command; transitioning, by the compute device, the compute device into a sleep state in response to receiving the sleep command; receiving, by the compute device, a wake command for the compute device; transitioning, by the compute device, the state of the compute device from the sleep state to an active state in response to receiving the wake command; sending, by the compute device, a wake request to the MAUSB device; reestablishing, by the compute device, the link with the MAUSB device; receiving, at the compute device, a response to the wake request from the MAUSB device; continuing, by the compute device, the MAUSB session with the MAUSB device if the response to the wake request is an acceptance of the wake request; and terminating, by the compute device, the MAUSB session with the MAUSB device if the response to the wake request is not an acceptance of the wake request.

Example 21 includes the subject matter of Example 20, and further including enumerating the MAUSB device subsequently to establishing the MAUSB session with the MAUSB device.

Example 22 includes the subject matter of any of Examples 20 and 21, and wherein enumerating the MAUSB device comprises enumerating a full tree of USB devices for the MAUSB session.

Example 23 includes the subject matter of any of Examples 20-22, and wherein transitioning into the sleep state comprises placing the MAUSB session into a persistent inactive state with the MAUSB device.

Example 24 includes the subject matter of any of Examples 20-23, and wherein sending the wake request to the MAUSB device comprises buffering the wake request prior to sending the wake request to the MAUSB device.

Example 25 includes the subject matter of any of Examples 20-24, and further including establishing a new MAUSB session with a new MAUSB device and terminating the MAUSB session with the MAUSB device.

Example 26 includes the subject matter of any of Examples 20-25, and further including enumerating the new MAUSB device subsequently to establishment of the new MAUSB session with the new MAUSB device.

Example 27 includes the subject matter of any of Examples 20-26, and wherein enumerating the new MAUSB device comprises enumerating a full tree of USB devices for the new MAUSB session.

Example 28 includes the subject matter of any of Examples 20-27, and further including establishing a new MAUSB session with the MAUSB device in response to terminating the session when the response to the wake request is not an acceptance of the wake request.

Example 29 includes the subject matter of any of Examples 20-28, and further including enumerating the MAUSB device in response to establishing the new MAUSB session with the MAUSB device.

Example 30 includes the subject matter of any of Examples 20-29, and wherein enumerating the MAUSB device comprises enumerating a full tree of USB devices for the new MAUSB session.

Example 31 includes a method for operating a media agnostic universal serial bus (MAUSB) device with a host compute device, the method comprising establishing, by the MAUSB device, a link with the host compute device; establishing, by the MAUSB device, an MAUSB session with the host compute device; receiving, by the MAUSB device, a sleep request for the MAUSB device from the host compute device; terminating, by the MAUSB device, the link with the host compute device; reestablishing, by the MAUSB device, the link with the host compute device after termination of the link; receiving, by the MAUSB device, a message from the host compute device after reestablishing the link; sending, by the MAUSB device, an acceptance to the message to the host compute device if the message is a wake request; and sending, by the MAUSB device, an error to the message to the host compute device if the message is not a wake request.

Example 32 includes the subject matter of Example 31, and further including waiting for a message from the host compute device to initialize the session subsequent to establishing the link to the host compute device.

Example 33 includes the subject matter of any of Examples 31 and 32, and further including enumerating one or more USB devices subsequent to establishing the session with the host compute device.

Example 34 includes the subject matter of any of Examples 31-33, and further including placing the MAUSB session into a persistent inactive state.

Example 35 includes the subject matter of any of Examples 31-34, and further including establishing a new link with a new host compute device.

Example 36 includes the subject matter of any of Examples 31-35, and further including waiting for a message from the new host compute device to initialize the session subsequent to establishing the new link to the new host compute device.

Example 37 includes the subject matter of any of Examples 31-36, and further including resetting an internal state of the MAUSB device subsequent to establishing the new link to the new compute device.

Example 38 includes the subject matter of any of Examples 31-37, and further including resetting an internal state of the MAUSB device subsequent to identifying the message is not a wake request.

Example 39 includes one or more machine readable storage media comprising a plurality of instructions stored thereon that in response to being executed result in a compute device performing the method of any of Examples 20-38.

Example 40 includes a compute device for operating a media agnostic universal serial bus (MAUSB) device, the compute device comprising means for establishing a link with the MAUSB device; means for establishing an MAUSB session with the MAUSB device; means for receiving a sleep command for the compute device; means for sending a sleep request to the MAUSB device in response to receiving the sleep command; means for terminating the link with the MAUSB device in response to receiving the sleep command; means for transitioning the compute device into a sleep state in response to receiving the sleep command; means for receiving a wake command for the compute device; means for transitioning the state of the compute device from the sleep state to an active state in response to receiving the wake command; means for sending a wake request to the MAUSB device; means for reestablishing the link with the MAUSB device; means for receiving, at the compute device, a response to the wake request from the MAUSB device; means for continuing the MAUSB session with the MAUSB device if the response to the wake request is an acceptance of the wake request; and means for terminating the MAUSB session with the MAUSB device if the response to the wake request is not an acceptance of the wake request.

Example 41 includes the subject matter of Example 40, and further including means for enumerating the MAUSB device subsequently to establishing the MAUSB session with the MAUSB device.

Example 42 includes the subject matter of any of Examples 40 and 41, and wherein the means for enumerating the MAUSB device comprises means for enumerating a full tree of USB devices for the MAUSB session.

Example 43 includes the subject matter of any of Examples 40-42, and wherein the means for transitioning into the sleep state comprises means for placing the MAUSB session into a persistent inactive state with the MAUSB device.

Example 44 includes the subject matter of any of Examples 40-43, and wherein the means for sending the wake request to the MAUSB device comprises means for buffering the wake request prior to sending the wake request to the MAUSB device.

Example 45 includes the subject matter of any of Examples 40-44, and further including means for establishing a new MAUSB session with a new MAUSB device and means for terminating the MAUSB session with the MAUSB device.

Example 46 includes the subject matter of any of Examples 40-45, and further including means for enumerating the new MAUSB device subsequently to establishment of the new MAUSB session with the new MAUSB device.

Example 47 includes the subject matter of any of Examples 40-46, and wherein the means for enumerating the new MAUSB device comprises means for enumerating a full tree of USB devices for the new MAUSB session.

Example 48 includes the subject matter of any of Examples 40-47, and further including means for establishing a new MAUSB session with the MAUSB device in response to terminating the session when the response to the wake request is not an acceptance of the wake request.

Example 49 includes the subject matter of any of Examples 40-48, and further including means for enumerating the MAUSB device in response to establishing the new MAUSB session with the MAUSB device.

Example 50 includes the subject matter of any of Examples 40-49, and wherein the means for enumerating the MAUSB device comprises means for enumerating a full tree of USB devices for the new MAUSB session.

Example 51 includes a compute device comprising a processor; and a memory having stored therein a plurality of instructions that when executed by the processor cause the compute device to perform the method of any of Examples 9-16.

Example 52 includes one or more machine readable storage media comprising a plurality of instructions stored thereon that in response to being executed result in a compute device performing the method of any of Examples 31-38.

Example 53 includes a media agnostic universal serial bus (MAUSB) device, the MAUSB device comprising means for establishing a link with the host compute device; means for establishing an MAUSB session with the host compute device; means for receiving a sleep request for the MAUSB device from the host compute device; means for terminating the link with the host compute device; means for reestablishing the link with the host compute device after termination of the link; means for receiving a message from the host compute device after reestablishing the link; means for sending an acceptance to the message to the host compute device if the message is a wake request; and means for sending an error to the message to the host compute device if the message is not a wake request.

Example 54 includes the subject matter of Example 53, and further including means for waiting for a message from the host compute device to initialize the session subsequent to establishing the link to the host compute device.

Example 55 includes the subject matter of any of Examples 53 and 54, and further including means for enumerating one or more USB devices subsequent to establishing the session with the host compute device.

Example 56 includes the subject matter of any of Examples 53-55, and further including means for placing the MAUSB session into a persistent inactive state.

Example 57 includes the subject matter of any of Examples 53-56, and further including means for establishing a new link with a new host compute device.

Example 58 includes the subject matter of any of Examples 53-57, and further including means for waiting for a message from the new host compute device to initialize the session subsequent to establishing the new link to the new host compute device.

Example 59 includes the subject matter of any of Examples 53-58, and further including means for resetting an internal state of the MAUSB device subsequent to establishing the new link to the new compute device.

Example 60 includes the subject matter of any of Examples 53-59, and further including means for resetting an internal state of the MAUSB device subsequent to identifying the message is not a wake request.

The invention claimed is:

1. A compute device for operating a media agnostic universal serial bus (MAUSB) device, the compute device comprising:
   a link connection manager to establish a link with the MAUSB device;
   a universal serial bus (USB) manager to establish an MAUSB session with the MAUSB device;
   an enumeration manager to perform an enumeration of the MAUSB device; and
   a state manager to transition a power state of the compute device into one of a plurality of power states,
   wherein the USB manager is to send, in response to transition of the power state of the compute device into a sleep state, a sleep request to the MAUSB device,
   wherein the link connection manager is to terminate the link with the MAUSB device in response to transition of the power state of the compute device into the sleep state,
   wherein the USB manager is to maintain, after termination of the link with the MAUSB device, the MAUSB session and the enumeration of the MAUSB device.

2. The compute device of claim 1, wherein the link with the MAUSB device is a WI-FI network link.

3. The compute device of claim 1, wherein the link with the MAUSB device is a BLUETOOTH network link.

4. The compute device of claim 1, wherein the link with the MAUSB device is an Ethernet network link, an INFINIBAND network link, a BLUETOOTH network link, a WI-FI network link, a WiMAX network link, a 3G network link, or a 4G LTE network link.

5. The compute device of claim 1, wherein the state manager is to (i) transition, in response to receipt of a sleep command for the compute device, the compute device into the sleep state, (ii) receive a wake command for the compute device, and (iii) transition, in response to receipt of the wake command, the power state of the compute device from the sleep state to an active state,
   wherein to maintain the MAUSB session and the enumeration of the MAUSB device comprises to maintain the MAUSB session and the enumeration of the MAUSB device while the compute device is in the sleep state.

6. The compute device of claim 5, wherein the USB manager is to send, in response to receipt of a wake command and after termination of the link with the MAUSB device, a wake request for the MAUSB device to the link connection manager,
   wherein the link connection manager is further to (i) reestablish the link with the MAUSB device in response to receipt of the wake request, (ii) send the wake request to the MAUSB device, and (iii) receive a response to the wake request from the MAUSB device.

7. A media agnostic universal serial bus (MAUSB) device, the MAUSB device comprising:

a link connection manager to establish a link with a host compute device; and a host manager to establish an MAUSB session with the host compute device;

wherein the link connection manager is further to (i) receive a sleep request for the MAUSB device from the host compute device, (ii) terminate the link with the host compute device without termination of the MAUSB session, (iii) maintain the MAUSB session after termination of the link and before reestablishment of the link, (iv) reestablish the link with the host compute device after termination of the link, and (v) receive a message from the host compute device after reestablishment of the link, and wherein the host manager is further to send an acceptance to the message to the host compute device and resume the MAUSB session if the message is a wake request, and wherein the host manager is further to send an error to the message to the host compute device if the message is not a wake request.

8. The MAUSB device of claim 7, wherein the link with the MAUSB device is a WI-FI network link.

9. The MAUSB device of claim 7, wherein the link with the MAUSB device is a BLUETOOTH network link.

10. The MAUSB device of claim 7, wherein the link with the MAUSB device is an Ethernet network link, an INFINIBAND network link, a BLUETOOTH network link, a WI-FI network link, a WiMAX network link, a 3G network link, or a 4G LTE network link.

11. The MAUSB device of claim 7, wherein the host manager is further to wait for a message from the host compute device to initialize the MAUSB session subsequent to the establishment of the link to the host compute device.

12. The MAUSB device of claim 7, wherein the MAUSB device further comprises a universal serial bus (USB) manager to enumerate one or more USB devices subsequent to the establishment of the MAUSB session with the host compute device.

13. The MAUSB device of claim 7, wherein the host manager is further to place the MAUSB session into a persistent inactive state.

14. One or more non-transitory computer-readable media comprising a plurality of instructions stored thereon that, when executed, cause a compute device to:

establish a link with a media agnostic universal serial bus (MAUSB) device;

establish an MAUSB session with the MAUSB device;

perform an enumeration of the MAUSB device;

transition a power state of the compute device into one of a plurality of power states;

send, in response to transition of the power state of the compute device to a sleep state, a sleep request to the MAUSB device;

terminate the link with the MAUSB device in response to transition of the power state of the compute device to the sleep state; and maintain, after termination of the link with the MAUSB device, the MAUSB session and the enumeration of the MAUSB device.

15. The one or more non-transitory computer-readable media of claim 14, wherein the link with the MAUSB device is a WI-FI network link.

16. The one or more non-transitory computer-readable media of claim 14, wherein the link with the MAUSB device is a BLUETOOTH network link.

17. The one or more non-transitory computer-readable media of claim 14, wherein the link with the MAUSB device is an Ethernet network link, an INFINIBAND network link, a BLUETOOTH network link, a WI-FI network link, a WiMAX network link, a 3G network link, or a 4G LTE network link.

18. The one or more non-transitory computer-readable media of claim 14, wherein the plurality of instructions further causes the compute device to:

transition, in response to receipt of a sleep command, the compute device into the sleep state;

receive a wake command for the compute device; and transition, in response to receipt of the wake command, the power state of the compute device from the sleep state to an active state, wherein to maintain the MAUSB session and the enumeration of the MAUSB device comprises to maintain the MAUSB session and the enumeration of the MAUSB device while the compute device is in the sleep state.

19. The one or more non-transitory computer-readable media of claim 18, wherein the plurality of instructions further causes the compute device to:

send, in response to receipt of a wake command and after termination of the link with the MAUSB device, a wake request for the MAUSB device;

reestablish the link with the MAUSB device in response to receipt of the wake request;

send the wake request to the MAUSB device; and receive a response to the wake request from the MAUSB device.

20. One or more non-transitory computer-readable media comprising a plurality of instructions stored thereon that, when executed, cause a media agnostic universal serial bus (MAUSB) device to:

establish a link with a host compute device;

establish an MAUSB session with the host compute device;

receive a sleep request for the MAUSB device from the host compute device;

terminate the link with the host compute device without termination of the MAUSB session;

maintain the MAUSB session after termination of the link and before reestablishment of the link;

reestablish the link with the host compute device after termination of the link;

receive a message from the host compute device after reestablishment of the link;

send an acceptance to the message to the host compute device and resume the MAUSB session if the message is a wake request; and send an error to the message to the host compute device if the message is not a wake request.

21. The one or more non-transitory computer-readable media of claim 20, wherein the link with the MAUSB device is a WI-FI network link.

22. The one or more non-transitory computer-readable media of claim 20, wherein the link with the MAUSB device is a BLUETOOTH network link.

23. The one or more non-transitory computer-readable media of claim 20, wherein the link with the MAUSB device is an Ethernet network link, an INFINIBAND network link, a BLUETOOTH network link, a WI-FI network link, a WiMAX network link, a 3G network link, or a 4G LTE network link.

24. The one or more non-transitory computer-readable media of claim 20, wherein the plurality of instructions further causes the MAUSB device to wait for a message from the host compute device to initialize the MAUSB session subsequent to the establishment of the link to the host compute device.

25. The one or more non-transitory computer-readable media of claim 20, wherein the plurality of instructions further causes the MAUSB device to enumerate one or more universal serial bus (USB) devices subsequent to the establishment of the MAUSB session with the host compute device.

26. A media agnostic universal serial bus (MAUSB) device comprising:
one or more non-transitory computer readable media to store instructions; and
a processor to execute the instructions to cause the MAUSB device to at least:
establish a link with a host compute device;
establish an MAUSB session with the host compute device;
receive a sleep request for the MAUSB device from the host compute device;
terminate the link with the host compute device without termination of the MAUSB session;
maintain the MAUSB session after termination of the link and before reestablishment of the link;
reestablish the link with the host compute device after termination of the link;
receive a message from the host compute device after reestablishment of the link;
send an acceptance to the message to the host compute device and resume the MAUSB session if the message is a wake request; and
send an error to the message to the host compute device if the message is not a wake request.

27. The MAUSB device of claim 26, wherein the link with the MAUSB device is a WI-FI network link.

28. The MAUSB device of claim 26, wherein the link with the MAUSB device is a BLUETOOTH network link.

29. The MAUSB device of claim 26, wherein the link with the MAUSB device is an Ethernet network link, an INFINIBAND network link, a BLUETOOTH network link, a WI-FI network link, a WiMAX network link, a 3G network link, or a 4G LTE network link.

30. The MAUSB device of claim 26, wherein the processor is to execute the instructions to further cause the MAUSB device to wait for a message from the host compute device to initialize the MAUSB session subsequent to the establishment of the link to the host compute device.

31. The MAUSB device of claim 26, wherein the processor is to execute the instructions to further cause the MAUSB device to enumerate one or more universal serial bus (USB) devices subsequent to the establishment of the MAUSB session with the host compute device.

32. The MAUSB device of claim 26, wherein the processor is to execute the instructions to further cause the MAUSB device to place the MAUSB session into a persistent inactive state.

33. A compute device for operating a media agnostic universal serial bus (MAUSB) device, the compute device comprising:
one or more non-transitory computer readable media to store instructions; and
a processor to execute the instructions to cause the compute device to at least:
establish a link with the MAUSB device;
establish an MAUSB session with the MAUSB device;
perform an enumeration of the MAUSB device;
transition a power state of the compute device into one of a plurality of power states;
send, in response to transition of the power state of the compute device into a sleep state, a sleep request to the MAUSB device;
terminate the link with the MAUSB device in response to transition of the power state of the compute device to the sleep state; and
maintain, after termination of the link with the MAUSB device, the MAUSB session and the enumeration of the MAUSB device.

34. The compute device of claim 33, wherein the link with the MAUSB device is a WI-FI network link.

35. The compute device of claim 33, wherein the link with the MAUSB device is a BLUETOOTH network link.

36. The compute device of claim 33, wherein the link with the MAUSB device is an Ethernet network link, an INFINIBAND network link, a BLUETOOTH network link, a WI-FI network link, a WiMAX network link, a 3G network link, or a 4G LTE network link.

37. The compute device of claim 33, wherein the processor executes the instructions to further cause the compute device to:
transition, in response to receipt of a sleep command for the compute device, the compute device into the sleep state;
receive a wake command for the compute device; and
transition, in response to receipt of the wake command, the power state of the compute device from the sleep state to an active state,
wherein to maintain the MAUSB session and the enumeration of the MAUSB device comprises to maintain the MAUSB session and the enumeration of the MAUSB device while the compute device is in the sleep state.

38. The compute device of claim 33, wherein the processor executes the instructions to further cause the compute device to:
send, in response to receipt of a wake command and after termination of the link with the MAUSB device, a wake request for the MAUSB device;
reestablish the link with the MAUSB device in response to receipt of the wake request;
send the wake request to the MAUSB device; and
receive a response to the wake request from the MAUSB device.

* * * * *

UNITED STATES PATENT AND TRADEMARK OFFICE
CERTIFICATE OF CORRECTION

PATENT NO. : 11,074,084 B2
APPLICATION NO. : 16/599194
DATED : July 27, 2021
INVENTOR(S) : Levy et al.

It is certified that error appears in the above-identified patent and that said Letters Patent is hereby corrected as shown below:

In the Drawings

In Figure 4, in Field (408), delete "OPEARTION" and insert -- OPERATION --.

In Figure 6, in Field (612), delete "OPEARTION" and insert -- OPERATION --.

Signed and Sealed this
Eighteenth Day of October, 2022

Katherine Kelly Vidal
*Director of the United States Patent and Trademark Office*